(12) United States Patent  (10) Patent No.: US 8,782,675 B2
Chauvel et al.  (45) Date of Patent: Jul. 15, 2014

(54) METHOD AND SYSTEM OF ACCESSING DISPLAY WINDOW MEMORY

(75) Inventors: Gerard Chauvel, Antibes (FR); Gilbert Cabillic, Brece (FR)

(73) Assignee: Texas Instruments Incorporated, Dallas, TX (US)

( * ) Notice: Subject to any disclaimer, the term of this patent is extended or adjusted under 35 U.S.C. 154(b) by 1908 days.

(21) Appl. No.: 11/560,883

(22) Filed: Nov. 17, 2006

(65) Prior Publication Data

US 2008/0127048 A1 May 29, 2008

(30) Foreign Application Priority Data

Oct. 13, 2006 (EP) .................................. 06291613

(51) Int. Cl.
*G06F 3/048* (2013.01)
*G06F 9/45* (2006.01)

(52) U.S. Cl.
USPC .......................................... 719/329; 717/139

(58) Field of Classification Search
USPC ............................ 717/139; 715/781; 719/329
See application file for complete search history.

(56) References Cited

U.S. PATENT DOCUMENTS

| 6,229,537 | B1 * | 5/2001 | Sobeski et al. ................. 715/803 |
| 6,335,743 | B1 * | 1/2002 | Owings .......................... 715/801 |
| 6,684,390 | B1 * | 1/2004 | Goff .............................. 717/148 |
| 7,051,288 | B2 * | 5/2006 | Bennett et al. ................ 715/781 |
| 2006/0031818 | A1 * | 2/2006 | Poff et al. ..................... 717/114 |

OTHER PUBLICATIONS

Bellotti et al. (DirectJ: Java APIs for Optimized 2D graphics, Software-Practice and Exeperience, 2001, p. 259-2750.*

* cited by examiner

*Primary Examiner* — Li B Zhen
*Assistant Examiner* — Hang Pan
(74) *Attorney, Agent, or Firm* — Michael A. Davis, Jr.; Frederick J. Telecky, Jr.

(57) ABSTRACT

A method and system of accessing display window memory. At least some of the illustrative embodiments are methods comprising abstracting display window memory by way of a first software object, accessing the display window memory by routines of a graphics library executed on a first processor (the accessing by way of the first software object), and displaying a window on a display screen, contents of the window selected at least in part by the routines of the graphics library.

12 Claims, 1 Drawing Sheet

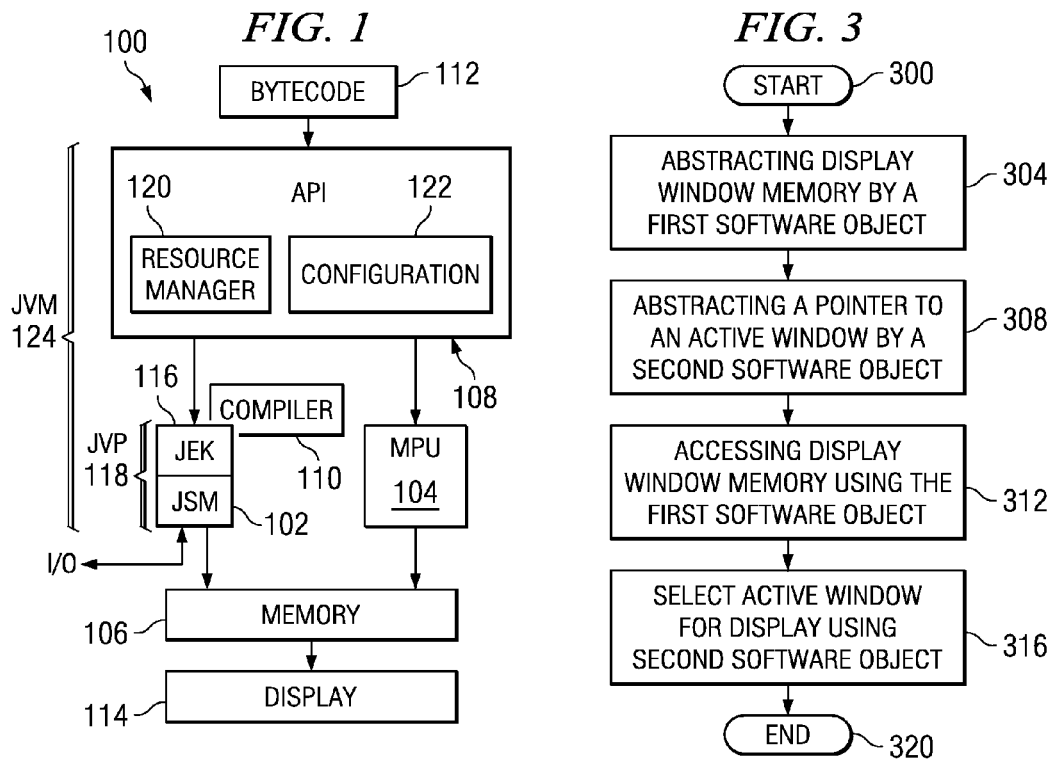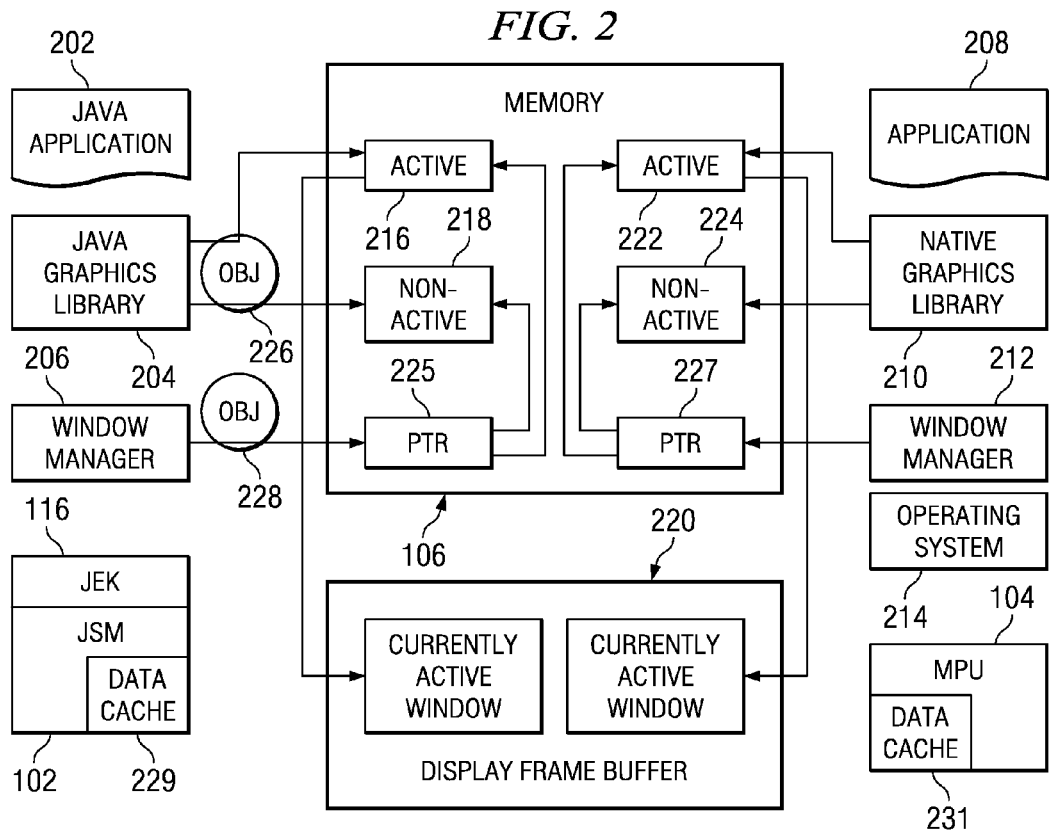

US 8,782,675 B2

METHOD AND SYSTEM OF ACCESSING DISPLAY WINDOW MEMORY

CROSS-REFERENCE TO RELATED APPLICATION

The present application claims priority to EP Application No. 06291613.5, filed on Oct. 13, 2006, hereby incorporated herein by reference.

BACKGROUND

Java™ is a programming language that, at the source code level, is similar to object oriented programming languages such as C++. Java language source code is compiled into an intermediate representation being a plurality "bytecodes" that define specific tasks. In some implementations, the bytecodes are further compiled to machine language for a particular processor. In order to speed the execution of Java language programs, some processors are specifically designed to execute some of the Java bytecodes directly. Many times, a processor that directly executes Java bytecodes is paired with a general purpose processor so as to accelerate Java program execution.

In systems where processors are paired, the processor that directly executes Java bytecodes relies on calls to library routines executed on the second processor to perform graphics functions. The calls to library routines executed on the second processor are referred to as calls to "native" library routines through a Java Native Interface (JNI). In order for the native library routines to operate, parameters are passed between the processors by way of the main memory. However, active data locations are stored in each processor's data cache, and the corresponding main memory locations may not reflect the latest parameter values. In order for the parameters to reside in the main memory when a native library routine is invoked thus requires the calling processor to flush its data cache. Likewise, the processor that executes the native library routine may evict data from its data cache in order to obtain the parameters. The evicted data is later re-loaded when the native library routines completes their tasks Because of the data cache flush and eviction mechanism to exchange parameters, calling native library routines from the processor directly executing Java bytecodes results in slow system performance regarding graphics operations.

SUMMARY

The problems noted above are solved in large part by a method and system of accessing display window memory. At least some of the illustrative embodiments are methods comprising abstracting display window memory by way of a first software object, accessing the display window memory by routines of a graphics library executed on a first processor (the accessing by way of the first software object), and displaying a window on a display screen, contents of the window selected at least in part by the routines of the graphics library.

BRIEF DESCRIPTION OF THE DRAWINGS

For a more detailed description of the various embodiments, reference will now be made to the accompanying drawings, wherein:

FIG. 1 illustrates a diagram of a system in accordance with at least some embodiments;

FIG. 2 illustrates a conceptual block diagram of operation with regard to display window memory in accordance with at least some embodiments; and FIG. 3 illustrates a method in accordance with at least some embodiments.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 illustrates a system 100 in accordance with at least some embodiments. In particular, the system 100 comprises at least one processor 102. Processor 102 is referred to for purposes of this disclosure as a Java Stack Machine ("JSM") 102. The JSM 102 comprises an interface to one or more input/output ("I/O") devices such as a keypad to permit a user to control various aspects of the system 100. In addition, data streams may be received from the I/O space into the JSM 102 to be processed by the JSM 102.

Optional processor 104 may be referred to as a Micro-Processor Unit ("MPU"). System 100 may also comprise memory 106 coupled to both the JSM 102 and MPU 104 and thus accessible by both processors. A portion of the memory 106 may be shared by both processors, and if desired, other portions of the memory 106 may be designated as private to one processor or the other. The memory 106 may be further coupled to a display 114.

System 100 also comprises a Java virtual machine (JVM) 124. The JVM 124 may comprise the Application Programming Interface implementation ("API") 108 and a Java Virtual Processor (JVP) 118 (discussed more below). The API implementation 108 comprises a resource manager 120 and a configuration 122. The resource manager 120 manages resource sharing between multiple threads and/or applications running on the system 100. The configuration 122 provides applications with an API, which API is used to access base functionalities of the system.

The JVP 118 may comprise a combination of software and hardware. The software may comprise a compiler 110 and a JSM Execution Kernel ("JEK") 116. The JEK 116 comprises software that is executable within the JSM 102, such as a class loader, bytecode verifier, garbage collector, and firmware to interpret the bytecodes that are not directly executed on the JSM processor 102. Thus, the hardware of the JVP 118 may comprise the JSM 102. The JVP 118 provides a layer of abstraction between the API 108 and a physical hardware platform (e.g., JSM 102) that executes Java bytecodes. Other components may be present as well.

Java language source code is converted or compiled to a series of bytecodes 112, with each individual one of the bytecodes referred to as an "opcode." Bytecodes 112 may be provided to the JEK 118, possibly compiled by compiler 110, and provided to the JSM 102. When appropriate, the JVP 118 may direct some method execution to the MPU 104.

In addition to executing at least some of the software to perform the JVM 124 functionality and executing compiled Java bytecodes, the MPU 104 also may execute other software programs like an operating system ("O/S") which performs various functions such as system memory management, system task management that schedules the software aspects of the JVM 124 and most or all other native tasks running on the system, and at least partial management of the display 114.

FIG. 2 shows, in block diagram form, a system to aid in conceptualization of operation of the various embodiments. FIG. 2 illustrates that in some embodiments a Java application 202, a Java graphics library 204, a window manager program 206 and the JEK 116 all execute (though not necessarily simultaneously) on the JSM 102. Likewise, another application 208, a native graphics library 210, a window manager program 212 and an operating system 214 all execute (though not necessarily simultaneously) on the MPU 104. The memory 106, accessible to both processors, contains memory portions dedicated to storing window data. In particular, each window ultimately displayed on a display 114 (FIG. 1) may have two areas in main memory: an active window (the window currently being displayed); and a non-active window (within modifications may be made).

Considering first the windows used by the Java application 202, there may be an active window 216 and a non-active window 218. In order to display the contents of the active window 216, the contents of the active window may be copied to a display frame buffer 220. Alternatively, a display driver may formulate the display pattern by reading directly from the active window 216 in memory 106. Likewise for the application 208 executed on the MPU 104, there may be an active window 222 and a non-active window 224. In order to display the contents of the active window 222, the contents of the active window may be copied to a display frame buffer 220. Alternatively, a display driver may formulate the display pattern by reading directly from the active window 222 in memory 106.

Periodically, the active and non-active status of each window is switched or "flipped" such that updates to each window may be displayed (if the window is visible on the display). In order to identify the active and non-active windows, each set of windows has a pointer 225 and 227 which contains an indication of the active window, such as a starting address in memory of the active window. The window manager programs 206 and 212 flip their respective active and non-active windows by changing the pointer values.

In the related art, Java applications do not have graphics libraries (e.g., line draw, set colors) executable on the JSM 102. Rather, in the related art Java applications make calls to graphic library routines executable on the illustrative MPU 104 (native library routines) through what is known as Java Native Interfaces (JNIs). Native library routines called through JNIs thus make modifications to the various windows for the Java applications. In order for the native library routines to operate, parameters are passed between the processors by way of the memory 106. However, active data locations are stored in each processor's data cache, and the corresponding memory 106 locations may not reflect the latest parameter values. In order for the parameters to reside in the memory 106 when a native library routine is invoked thus requires the calling processor to flush its data cache (e.g., data cache 229). Likewise, the processor that executes the native library routine may evict data from its data cache (e.g., data cache 231) in order to obtain the parameters. The evicted data is later re-loaded when the native library routines complete their tasks. Because of the data cache flush and eviction mechanism to exchange parameters, calling native library routines from the processor directly executing Java bytecodes results in slow system performance regarding graphics operations.

In accordance with embodiments of the invention, a Java graphics library 204 is provided. The Java graphics library 204 comprises graphics routines that are executable by the JSM 102 (e.g., the graphics routines comprise Java bytecodes or instructions from another instruction set executable by the JSM 102). In order for the routines of the Java graphics library to reach and modify the window memory, the Java application 202 alone or in combination with the JEK 116 create a Java object 226 which provides access to the window memory for the Java application 202 and/or routines of the Java graphics library 204. In this way, most if not all calls to a graphics routine may be executed on the JSM 102 side without the need to use a JNI to reach native graphic library routines and the corresponding cache flush to ensure proper exchange of parameters. Further the Java application 202 alone or in combination with the JEK 116 create a second object 228 which provides access to the pointer 225. Thus, the window manager 206 may flip the active and non-active windows by appropriately adjusting the pointer 225.

Inasmuch as the two applications 202 and 208 may be modifying the contents of windows displayed on the same display device, some coordination between the window manager program 206 executed on the JSM 102 and the window manager program 212 executed on the MPU 104 may be desirable. For example, each time the Java application 202 creates a new window, the windows manager program 212 executed on the MPU 104 may be informed such that the program can control placement and whether the new window is in the foreground or background. Likewise, each time the Java application 202 moves an existing window or re-sizes an existing window, the window manager program 212 may be informed such that appropriate action is taken. The notification between the window manager program 206 and the window manager program 212 may take many forms, for example a JNI call from the window manager program 206.

FIG. 3 illustrates a method (e.g., software) in accordance with at least some embodiments. In particular, the method starts (block 300) and proceeds to abstracting display window memory by a first software object (block 304). In some embodiments, the display window memory is window memory used by a Java application program, and the first software object is a Java object. Next, illustrative methods proceeds to abstracting a pointer to an active window of the window memory, the abstracting by a second software object (block 308). In some embodiments, the second software object is a Java object accessible by a window manager program executed a processor that directly executes Java bytecodes. Using the first software object, the display window memory is accessed (block 312). Once the display window memory is accessed, an active window is selected (block 316), and the illustrative process ends (block 320).

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor.

While various embodiments of the invention have been shown and described, modifications thereof can be made by one skilled in the art without departing from the spirit and teachings of the invention. The embodiments described herein are illustrative only, and are not intended to be limiting. Numerous variations and modifications will become apparent to those skilled in the art once the above disclosure is fully appreciated. It is intended that the following claims be interpreted to embrace all such variations and modifications.

What is claimed is:

1. A method comprising:
   in a display window memory, storing contents of first and second windows;
   on a display device, displaying the contents of the first and second windows from the display window memory;
   with a first processor that executes Java bytecodes directly: creating a Java software object for abstracting the display window memory; executing a first application program for controlling the contents of the first window through the Java software object, at least in part by calling routines of a Java graphics library for performing operations in the first window; and executing a first window manager program; and
   with a second processor: executing a second application program for controlling the contents of the second window; and executing a second window manager program;
   wherein executing the first window manager program includes executing the first window manager program for, through a Java native interface call, informing the second window manager program about creation, movement and re-sizing of the first window; and
   wherein executing the second window manager program includes executing the second window manager program for: controlling placement of the second window on the display device; controlling whether the first window is located in a foreground on the display device; and controlling placement of the first window on the display device, in response to being informed by the first window manager program through the Java native interface call.

2. The method of claim 1, wherein the Java software object is a first Java software object, and wherein the method further comprises:
   with the first processor: creating a second Java software object for abstracting a pointer to an active window; and selecting the active window for display as the first window on the display device by modifying the pointer of the second Java software object.

3. The method of claim 2, wherein the pointer is a first pointer, wherein the active window is a first active window, and wherein the method further comprises:
   with the second processor: creating a second pointer to a second active window; and selecting the second active window for display as the second window on the display device by modifying the second pointer.

4. The method of claim 1, wherein the Java bytecodes are first Java bytecodes, and wherein the second processor executes second Java bytecodes by converting the second Java bytecodes to machine language commands.

5. A system comprising:
   a display window memory for storing contents of first and second windows;
   a display device coupled to the display window memory for displaying the contents of the first and second windows from the display window memory;
   a first processor coupled to the display window memory for: executing Java bytecodes directly; creating a Java software object for abstracting the display window memory; executing a first application program for controlling the contents of the first window through the Java software object, at least in part by calling routines of a Java graphics library for performing operations in the first window; and executing a first window manager program; and
   a second processor coupled to the display window memory for: executing a second application program for controlling the contents of the second window; and executing a second window manager program;
   wherein executing the first window manager program includes executing the first window manager program for, through a Java native interface call, informing the second window manager program about creation, movement and re-sizing of the first window; and
   wherein executing the second window manager program includes executing the second window manager program for: controlling placement of the second window on the display device; controlling whether the first window is located in a foreground on the display device; and controlling placement of the first window on the display device, in response to being informed by the first window manager program through the Java native interface call.

6. The system of claim 5, wherein the Java bytecodes are first Java bytecodes, and wherein the second processor is for executing second Java bytecodes by converting the second Java bytecodes to machine language commands.

7. The system of claim 5, wherein the Java software object is a first Java software object, and wherein the first processor is for: creating a second Java software object for abstracting a pointer to an active window; and selecting the active window for display as the first window on the display device by modifying the pointer of the second Java software object.

8. The system of claim 7, wherein the pointer is a first pointer, wherein the active window is a first active window, and wherein the second processor is for: creating a second pointer to a second active window; and selecting the second active window for display as the second window on the display device by modifying the second pointer.

9. A non-transitory computer-readable storage medium storing a software program that is executable by a computer system for causing the computer system to perform operations comprising:
   in a display window memory, storing contents of first and second windows;
   on a display device, displaying the contents of the first and second windows from the display window memory;
   with a first processor that executes Java bytecodes directly: creating a Java software object for abstracting the display window memory; executing a first application program for controlling the contents of the first window through the Java software object, at least in part by calling routines of a Java graphics library for performing operations in the first window; and executing a first window manager program; and with a second processor: executing a second application program for controlling the contents of the second window; and executing a second window manager program;

wherein executing the first window manager program includes executing the first window manager program for, through a Java native interface call, informing the second window manager program about creation, movement and re-sizing of the first window; and wherein executing the second window manager program includes executing the second window manager program for: controlling placement of the second window on the display device; controlling whether the first window is located in a foreground on the display device; and controlling placement of the first window on the display device, in response to being informed by the first window manager program through the Java native interface call.

10. The computer-readable storage medium of claim 9, wherein the Java software object is a first Java software object, and wherein the operations comprise:

with the first processor: creating a second Java software object for abstracting a pointer to an active window; and selecting the active window for display as the first window on the display device by modifying the pointer of the second Java software object.

11. The computer-readable storage medium of claim 10, wherein the pointer is a first pointer, wherein the active window is a first active window, and wherein the operations comprise:

with the second processor: creating a second pointer to a second active window; and selecting the second active window for display as the second window on the display device by modifying the second pointer.

12. The computer-readable storage medium of claim 9, wherein the Java bytecodes are first Java bytecodes, and wherein the operations comprise:

with the second processor, executing second Java bytecodes by converting the second Java bytecodes to machine language commands.

* * * * *